(12) United States Patent
Yoo et al.

(10) Patent No.: US 11,090,634 B2
(45) Date of Patent: *Aug. 17, 2021

(54) METHOD FOR PREPARING A CARBON-SUPPORTED, PLATINUM-TRANSITION METAL ALLOY NANOPARTICLE FUEL CELL CATALYST

(71) Applicants: KOREA INSTITUTE OF SCIENCE AND TECHNOLOGY, Seoul (KR); GLOBAL FRONTIER CENTER FOR MULTISCALE ENERGY SYSTEMS, Seoul (KR)

(72) Inventors: Sung Jong Yoo, Seoul (KR); Sehyun Lee, Seoul (KR); Hee-Young Park, Seoul (KR); Jong Hyun Jang, Seoul (KR); Jin Young Kim, Seoul (KR); Hyoung-Juhn Kim, Seoul (KR); Jea-woo Jung, Seoul (KR)

(73) Assignees: Korea Institute of Science and Technology, Seoul (KR), PART INTEREST; Global Frontier Center for Multiscale Energy Systems, Seoul (KR), PART INTEREST ( * ) Notice: Subject to any disclaimer, the term of this patent is extended or adjusted under 35 U.S.C. 154(b) by 123 days.

This patent is subject to a terminal disclaimer.

(21) Appl. No.: 16/268,913

(22) Filed: Feb. 6, 2019

(65) Prior Publication Data
US 2020/0061584 A1 Feb. 27, 2020

(30) Foreign Application Priority Data
Aug. 24, 2018 (KR) .................. 10-2018-0099464

(51) Int. Cl.
*B01J 23/42* (2006.01)
*B01J 37/16* (2006.01)
*H01M 4/92* (2006.01)

(52) U.S. Cl.
CPC .............. *B01J 23/42* (2013.01); *B01J 37/16* (2013.01); *B01J 2523/17* (2013.01); *B01J 2523/27* (2013.01); *B01J 2523/47* (2013.01); *B01J 2523/55* (2013.01); *B01J 2523/67* (2013.01); *B01J 2523/821* (2013.01); *B01J 2523/824* (2013.01); *B01J 2523/825* (2013.01); *B01J 2523/842* (2013.01); *B01J 2523/845* (2013.01); *B01J 2523/847* (2013.01)

(58) Field of Classification Search
CPC ......... B01J 23/42; H01M 4/926; H01M 4/921
See application file for complete search history.

(56) References Cited

U.S. PATENT DOCUMENTS

| 4,794,054 | A * | 12/1988 | Ito | B01J 23/8913 429/524 |
| 7,037,873 | B2 * | 5/2006 | Kato | H01M 4/921 429/483 |
| 8,859,458 | B2 * | 10/2014 | Hwang | B82Y 30/00 429/487 |
| 10,090,532 | B2 * | 10/2018 | Arai | H01M 4/926 |
| 2011/0081546 | A1 * | 4/2011 | Kim | B22F 1/0022 428/372 |
| 2011/0118111 | A1 * | 5/2011 | Hwang | H01M 4/921 502/185 |
| 2013/0150235 | A1 * | 6/2013 | Roh | H01M 4/921 502/185 |
| 2013/0252135 | A1 * | 9/2013 | Zhou | H01M 4/921 429/492 |
| 2016/0301083 | A1 * | 10/2016 | Arai | H01M 4/8673 |
| 2018/0006313 | A1 * | 1/2018 | Haas | B01J 23/002 |

OTHER PUBLICATIONS

Liu, H., Li, C., Chen, D. et al. Uniformly dispersed platinum-cobalt alloy nanoparticles with stable compositions on carbon substrates for methanol oxidation reaction. Sci Rep 7, 11421 (2017). https://doi.org/10.1038/s41598-017-10223-2 (Year: 2017).*
Kug-Seung Lee et al., "Effect of oleylamine concentration on the structure and oxygen reduction activity of carbon-supported surface-Pt-enriched Pt$_3$Au electrocatalysts", Journal of Power Sources, 2015, pp. 130-135, vol. 290.
Binghong Han et al., "Record activity and stability of dealloyed bimetallic catalysts for proton exchange membrane fuel cells", Energy & Environmental Science, 2015, pp. 258-266, vol. 8.

* cited by examiner

*Primary Examiner* — Sheng H Davis
(74) *Attorney, Agent, or Firm* — Rabin & Berdo, P.C.

(57) ABSTRACT

Disclosed is a method for preparing a carbon-supported platinum-transition metal alloy nanoparticle catalyst using a stabilizer. According to the method, the transition metal on the nanoparticle surface and the stabilizer are simultaneously removed by treatment with acetic acid. Therefore, the method enables the preparation of a carbon-supported platinum-transition metal alloy nanoparticle catalyst in a simple and environmentally friendly manner compared to conventional methods. The carbon-supported platinum-transition metal alloy nanoparticle catalyst can be applied as a high-performance, highly durable fuel cell catalyst.

9 Claims, 5 Drawing Sheets

Before treatment with acetic acid/ethanol

After treatment with acetic acid/ethanol

METHOD FOR PREPARING A CARBON-SUPPORTED, PLATINUM-TRANSITION METAL ALLOY NANOPARTICLE FUEL CELL CATALYST

CROSS-REFERENCE TO RELATED APPLICATIONS

This application claims priority under 35 U.S.C. § 119 to Korean Patent Application No. 10-2018-0099464 filed on Aug. 24, 2018 in the Korean Intellectual Property Office, the disclosure of which is incorporated herein by reference in its entirety.

BACKGROUND OF THE INVENTION

1. Field of the Invention

The present invention relates to a method for preparing a carbon-supported platinum-transition metal alloy nanoparticle catalyst.

2. Description of the Related Art

A number of carbon-supported platinum-transition metal alloy catalysts are currently used as high-performance fuel cell catalysts. However, the transition metals tend to dissolve from the alloy catalysts under fuel cell driving conditions and deteriorate the performance of the catalysts, which is considered as an important technical problem.

In an effort to solve this problem, a technique was developed in which a transition metal is dissolved from the surface of alloy nanoparticles using a strong acid such as sulfuric acid or nitric acid, achieving enhanced catalytic stability.

On the other hand, the use of a stabilizer is required for the preparation of a nanoparticle catalyst. However, the stabilizer adsorbed to the surface of the catalyst deteriorates the performance of the catalyst. Thus, the stabilizer needs to be removed. The stabilizer is usually removed by annealing in air (J. Power Sources, 290 (2015) 130-135).

According to the prior art technique, a highly durable carbon-supported platinum-transition metal alloy catalyst for a fuel cell is prepared by a method including the following four steps: 1) supporting platinum-transition metal alloy nanoparticles on carbon using a stabilizer, 2) annealing the platinum-transition metal alloy nanoparticles supported on the carbon in an air atmosphere to remove the stabilizer, 3) annealing the supported platinum-transition metal alloy nanoparticles in a hydrogen atmosphere to reduce the particle surface, and 4) dissolving the transition metal using a strong acid (Energy Environ. Sci., 8 (2015) 258-266).

However, this method is complicated, and the use of the strong acid involves the problem of environmental pollution and poses a danger during processing.

In an attempt to solve such problems, another method for preparing a carbon-supported platinum-transition metal alloy nanoparticle catalyst was developed which includes the following steps: 1) supporting platinum-transition metal alloy nanoparticles on carbon using a stabilizer, 2) treating the platinum-transition metal alloy nanoparticles supported on the carbon with an acetic acid solution to remove the stabilizer and dissolve the transition metal from the surface of the alloy particles, and 3) annealing the treated alloy particles in a hydrogen atmosphere at 600 to 1000° C.

Water is used as the solvent of the acetic acid solution. However, the water-insoluble stabilizer (e.g., oleylamine) is not easy to remove during the treatment of the platinum-transition metal alloy nanoparticles with the acetic acid solution.

SUMMARY OF THE INVENTION

One object of the present invention is to provide a method for preparing a carbon-supported platinum-transition metal alloy nanoparticle catalyst using a stabilizer in which the transition metal on the nanoparticle surface and the stabilizer are simultaneously removed by treatment with acetic acid, enabling the preparation of the catalyst in a simple and environmentally friendly manner compared to conventional methods.

A further object of the present invention is to provide a carbon-supported platinum-transition metal alloy nanoparticle catalyst prepared by the method that can be applied as a high-performance, highly durable fuel cell catalyst.

One aspect of the present invention is directed to a method for preparing a carbon-supported platinum-transition metal alloy nanoparticle catalyst, including (a) mixing a platinum precursor, a transition metal precursor, carbon, a stabilizer, and a reducing agent solution, and washing and drying the mixture to obtain platinum-transition metal alloy nanoparticles supported on the carbon; (b) mixing the platinum-transition metal alloy nanoparticles supported on the carbon with a dilute solution of acetic acid in an organic solvent, and washing and drying the mixture; and (c) annealing the nanoparticles treated with the acetic acid/organic solvent.

A further aspect of the present invention is directed to a carbon-supported platinum-transition metal alloy nanoparticle catalyst prepared by the method.

Another aspect of the present invention is directed to an electric device including the carbon-supported platinum-transition metal alloy nanoparticle catalyst wherein the electric device is selected from electric vehicles, hybrid electric vehicles, plug-in hybrid electric vehicles, and energy storage systems.

According to the method of the present invention, the transition metal on the nanoparticle surface and the stabilizer are simultaneously removed by treatment with acetic acid. Therefore, the method of the present invention enables the preparation of the carbon-supported platinum-transition metal alloy nanoparticle catalyst in a simple and environmentally friendly manner compared to conventional methods. In addition, the carbon-supported platinum-transition metal alloy nanoparticle catalyst can be applied as a high-performance, highly durable fuel cell catalyst.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
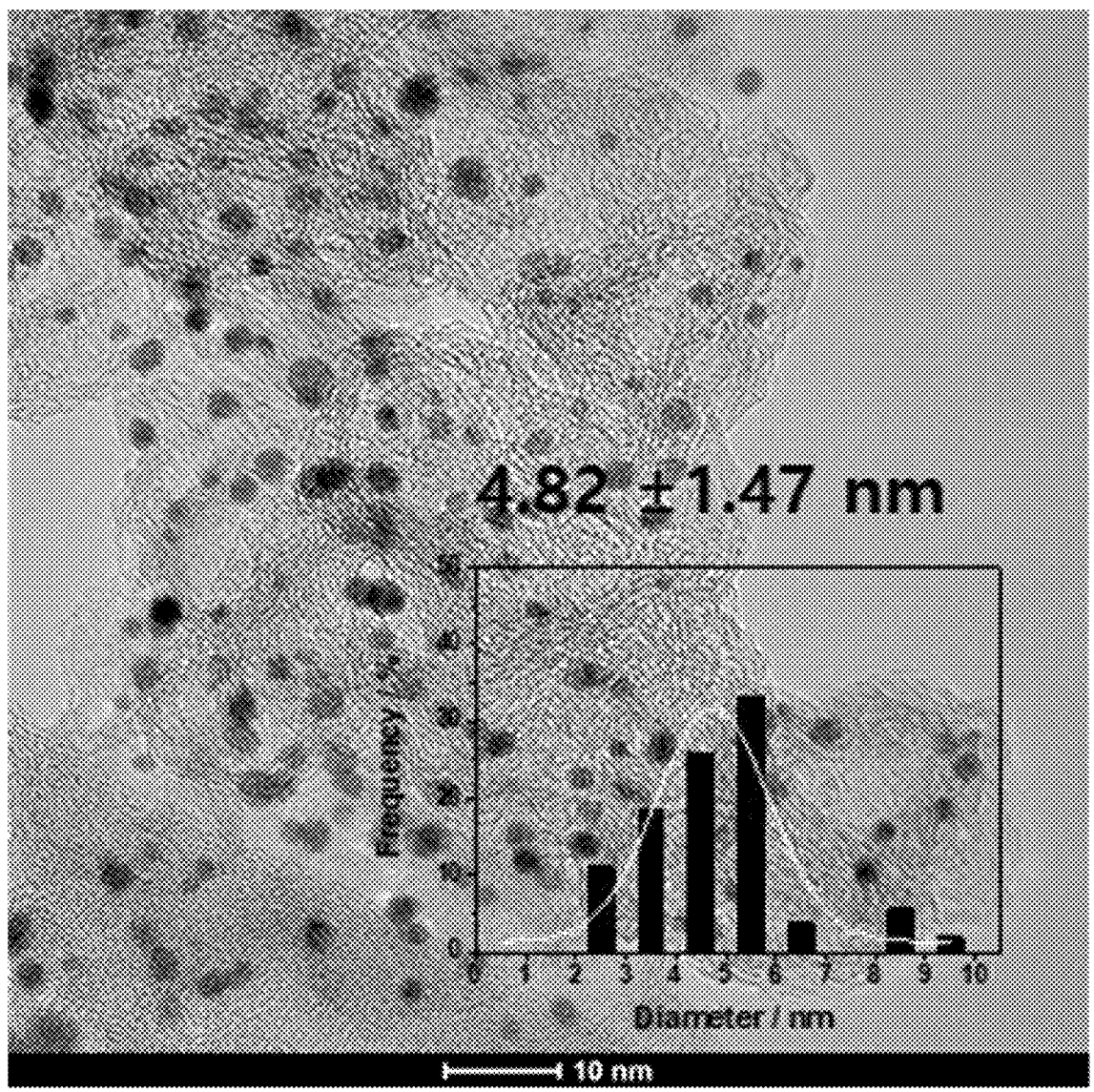
FIG. 1 is a transmission electron microscopy image of a catalyst prepared in Example 1.

Several aspects and various embodiments of the present invention will now be described in more detail.

One aspect of the present invention provides a method for preparing a carbon-supported platinum-transition metal alloy nanoparticle catalyst, including (a) mixing a platinum precursor, a transition metal precursor, carbon, a stabilizer, and a reducing agent solution, and washing and drying the mixture to obtain platinum-transition metal alloy nanoparticles supported on the carbon; (b) mixing the platinum-transition metal alloy nanoparticles supported on the carbon with a dilute solution of acetic acid in an organic solvent, and washing and drying the mixture; and (c) annealing the nanoparticles treated with the acetic acid/organic solvent.

A conventional method for preparing a carbon-supported platinum-transition metal alloy nanoparticle catalyst requires the removal of a stabilizer by annealing and the dissolution of a transition metal from the alloy nanoparticle surface using a strong acid. In contrast, according to the method of the present invention, the stabilizer and the transition metal on the alloy nanoparticle surface are simultaneously removed by treatment with acetic acid. Therefore, the method of the present invention enables the preparation of the carbon-supported platinum-transition metal alloy nanoparticle catalyst in a simple and environmentally friendly manner compared to the conventional method.

The rough surface of the catalyst needs to be smooth in order to prevent the transition metal from being dissolved during driving of a fuel cell. This surface smoothness is achieved mainly by annealing at high temperature in a hydrogen/argon atmosphere.

According to one embodiment of the present invention, the transition metal may be selected from cobalt, palladium, osmium, ruthenium, gallium, titanium, vanadium, chromium, manganese, iron, nickel, copper, zinc, and mixtures thereof, but is not limited thereto. Cobalt is preferably used.

According to a further embodiment of the present invention, the stabilizer may be selected from oleylamine, octylamine, hexadecylamine, octadecylamine, trialkylphosphines, oleic acid, lauric acid, linoleic acid, erucic acid, dodecylic acid, and mixtures, but is not limited thereto. Oleylamine is preferably used.

According to another embodiment of the present invention, the reducing agent may be selected from borohydride compounds, such as sodium borohydride, lithium borohydride, and lithium triethylborohydride, alcohols, such as ethylene glycol, diethylene glycol, triethylene glycol, tetraethylene glycol, dipropylene glycol, propanediol, and butanediol, aldehydes, such as formaldehyde, and mixtures thereof, but is not limited thereto. Sodium borohydride is preferably used.

According to another embodiment of the present invention, the organic solvent may be selected from ethanol, acetone, methanol, ethylene glycol, and mixtures thereof, but is not limited thereto. Ethanol is preferably used.

According to another embodiment of the present invention, the concentration of the dilute solution may be from 1 to 16 M, preferably from 1 to 10 M, more preferably from 1 to 5 M.

A number of carbon-supported platinum-transition metal alloy catalysts are currently used as high-performance fuel cell catalysts. However, the transition metals tend to dissolve from alloy catalysts and deteriorate the performance of the catalysts, which is considered as an important technical problem. In an attempt to solve this problem, a method for preparing a carbon-supported platinum-transition metal alloy nanoparticle catalyst was developed which includes the following steps: 1) supporting platinum-transition metal alloy nanoparticles on carbon using a stabilizer, 2) treating the platinum-transition metal alloy nanoparticles supported on the carbon with an acetic acid solution to remove the stabilizer and dissolve the transition metal from the surface of the alloy particles, and 3) annealing the treated alloy particles in a hydrogen atmosphere at 600 to 1000° C.

The stabilizer adsorbed to the surface of the catalyst deteriorates the performance of the catalyst. Thus, the stabilizer needs to be removed. However, the stabilizer (e.g., oleylamine) insoluble in water as the solvent of the acetic acid solution is not easy to remove during the treatment of the platinum-transition metal alloy nanoparticles with the acetic acid solution.

In contrast, according to the method of the present invention, when the nanoparticles are treated with the dilute solution, the use of the organic solvent (e.g., ethanol) capable of readily dissolving the stabilizer (e.g., oleylamine) as a solvent to dilute acetic acid facilitates removal of the stabilizer, leading to an improvement in the activity of the catalyst. In addition, the use of the organic solvent reduces the amount of the transition metal (e.g., cobalt) dissolved, resulting in improved atom utilization.

According to another embodiment of the present invention, the washing in steps (a) and (b) may be performed using one or more suitable solvents. Examples of the washing solvents include, but are not limited to, ethanol, distilled water, and a mixture thereof. Preferably, ethanol and distilled water are used in step (a) and distilled water is used in step (b).

According to another embodiment of the present invention, the drying in steps (a) and (b) may be performed at room temperature.

According to another embodiment of the present invention, the annealing in step (c) may be performed in a hydrogen atmosphere at a temperature of 600 to 1000° C., preferably 700 to 900° C., more preferably 750 to 850° C.

Although not explicitly described in the Examples section that follows, carbon-supported platinum-transition metal alloy nanoparticle catalysts were prepared by varying the kinds of the transition metal, the stabilizer, the reducing agent, and the organic solvent, the concentration of the dilute solution of acetic acid, the kind of the washing solvents in steps (a) and (b), the drying temperature in steps (a) and (b), and the annealing conditions in step (c); fuel cells including cathodes coated with the catalysts were fabricated; and loss of the catalysts from the cathodes after 300 cycles of charge/discharge was investigated.

As a result, when the following conditions were all met, the very small particle sizes (3 to 5 nm) of the resulting platinum-transition metal alloy nanoparticles before the annealing (step (c)) were maintained even after the annealing and no loss of the catalysts from the cathodes was observed even after 300 cycles of charge/discharge, unlike when other conditions and other numerical ranges were employed.

(i) The transition metal is cobalt, (ii) the stabilizer is oleylamine, (iii) the reducing agent is sodium borohydride, (iv) the organic solvent is ethanol, (v) the concentration of the dilute solution is from 1 to 16 M, (vi) the washing in step (a) is performed using ethanol and distilled water, (vii) the washing in step (b) is performed using distilled water, (viii) the drying in steps (a) and (b) is performed at room temperature, and (ix) the annealing in step (c) is performed in a hydrogen atmosphere at a temperature of 600 to 1000° C.

If one or more of the above conditions were not met, the size of the resulting platinum-transition metal alloy nanoparticles after the annealing (step (c)) increased by 10 nm compared to that before the annealing. Further, considerable loss of the catalysts from the cathodes was observed after 300 cycles of charge/discharge.

A further aspect of the present invention provides a carbon-supported platinum-transition metal alloy nanoparticle catalyst prepared by the method.

According to one embodiment of the present invention, the carbon-supported platinum-transition metal alloy nanoparticle catalyst may be a fuel cell cathode catalyst.

Another aspect of the present invention provides an electric device including the carbon-supported platinum-transition metal alloy nanoparticle catalyst wherein the electric device is selected from electric vehicles, hybrid electric vehicles, plug-in hybrid electric vehicles, and energy storage systems.

The present invention will be explained in detail with reference to the following examples, including comparative examples and experimental examples, and the accompanying drawings.

Example 1: Synthesis of Platinum-Cobalt Nanoparticle Catalyst Treated with Acetic Acid/Ethanol A platinum precursor, a cobalt precursor, oleylamine, and carbon (KETJENBLACK by AkzoNobel, hereinafter "KB") were dispersed in anhydrous ethanol, and then a solution of 0.23 g of sodium borohydride as a reducing agent in 10 ml of anhydrous ethanol was added thereto. After 12-h stirring, the reaction mixture was washed with ethanol and distilled water and dried at room temperature to obtain platinum-cobalt alloy nanoparticles supported on the carbon ($Pt_3Co/$KB-AP). The platinum-cobalt alloy nanoparticles supported on the carbon were dispersed in a 1 M dilute solution of acetic acid in ethanol at room temperature. After 12-h stirring, the resulting solution was washed with ethanol and distilled water and dried at room temperature to obtain alloy nanoparticles treated with acetic acid/ethanol ($Pt_3Co/$KB-1AE-AP). The treated alloy nanoparticles ($Pt_3Co/$KB-1AE-AP) were annealed in a hydrogen/argon (5%/95%) atmosphere at 800° C. to prepare a carbon-supported platinum-cobalt alloy nanoparticle catalyst treated with acetic acid/ethanol ($Pt_3Co/$KB-1AE-H800).

Example 1-1: Construction of Membrane Electrode Assembly (MEA)

In this example, a membrane electrode assembly (MEA) for a fuel cell was constructed using the carbon-supported platinum-transition metal alloy nanoparticle catalyst prepared in Example 1 as a cathode catalyst. Specifically, $Pt_3Co/$KB-1AE-H800 prepared in Example 1, 5 wt % of a solution containing NAFION, and isopropyl alcohol IPAI were mixed together to prepare a catalyst slurry. The catalyst slurry was applied to a NAFION 211 electrolyte using an air sprayer to produce a cathode. An anode was produced in the same manner as described above, except that a commercial platinum catalyst (Pt/C) was used instead of $Pt_3Co/$KB-1AE-H800. The cathode and the anode were assembled into a membrane electrode assembly (MEA).

Comparative Example 1: Synthesis of Platinum-Cobalt Nanoparticle Catalyst Treated with Acetic Acid/Distilled Water A carbon-supported platinum-cobalt alloy nanoparticle catalyst was prepared in the same manner as in Example 1, except that a 1 M dilute solution of acetic acid in distilled water was used instead of the 1 M dilute solution of acetic acid in ethanol.

Comparative Example 1-1: Construction of Membrane Electrode Assembly (MEA)

An MEA was constructed in the same manner as in Example 1-1, except that the carbon-supported platinum-cobalt alloy nanoparticle catalyst prepared in Comparative Example 1 was used instead of the carbon-supported platinum-cobalt alloy nanoparticle catalyst prepared in Example 1.

Experimental Example 1: Size Analysis of the Nanoparticles by Transmission Electron Microscopy (TEM)

The dispersion degrees and particle sizes of the carbon-supported platinum-cobalt alloy nanoparticles in the carbon-supported platinum-cobalt alloy nanoparticle catalyst prepared in Example 1 were observed by transmission electron microscopy (TEM).

FIG. 1 is a transmission electron microscopy image of the catalyst prepared in Example 1. The particles were spherical in shape with an average particle size of 4.8 nm and were uniformly supported on the carbon.

Experimental Example 2: Analysis of Stabilizer Removal Efficiencies

The stabilizer removal efficiencies from the catalyst prepared in Example 1 were compared with those from the catalyst prepared in Comparative Example 1. For the catalyst prepared in Comparative Example 1, the stabilizer removal efficiencies were measured with varying concentrations of the dilute solution of acetic acid from 1 M to 5 M and 16 M.

Figure 2:
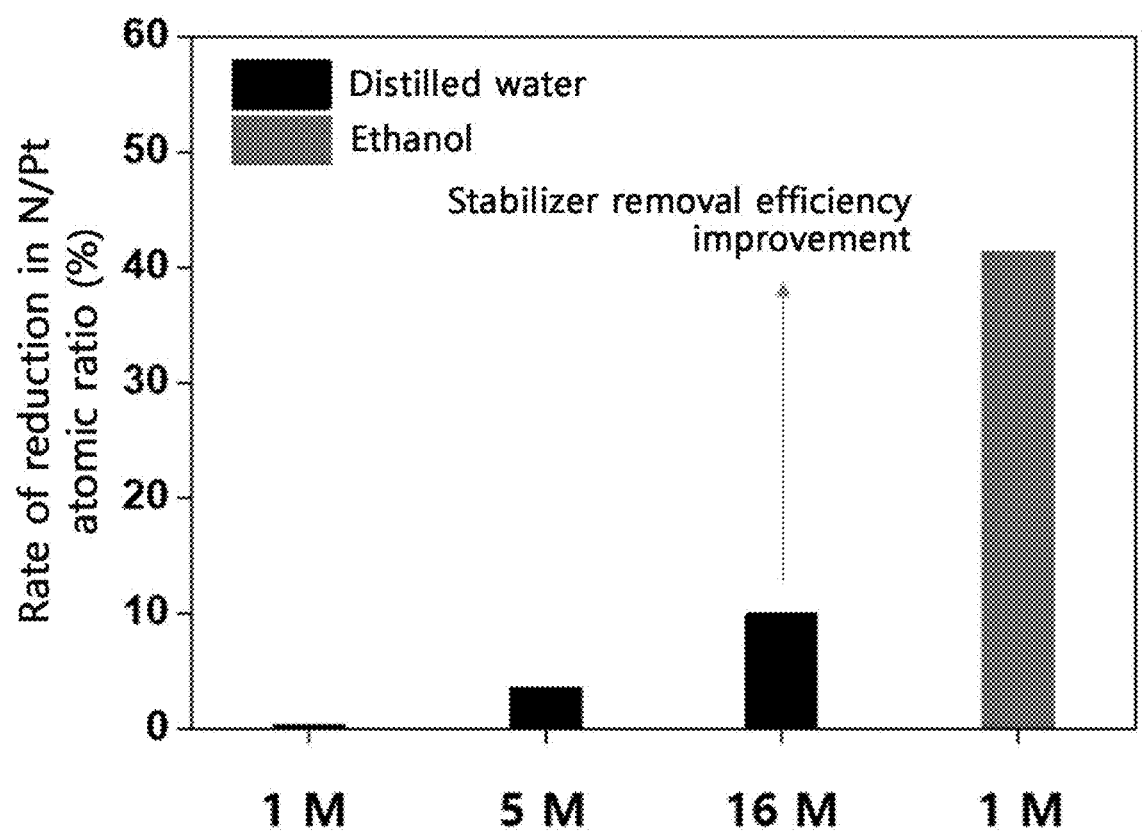
FIG. 2 compares stabilizer removal efficiencies by measuring the amounts of the stabilizer remaining in catalysts prepared in Example 1 and Comparative Example 1.

FIG. 2 compares the stabilizer removal efficiencies by measuring the amounts of the stabilizer remaining in the catalysts prepared in Example 1 and Comparative Example 1. The y-axis in FIG. 2 represents rates of reduction in the atomic ratio of the nitrogen atoms (N) of the stabilizer to the Pt of each catalyst, indicating the amounts of the stabilizer removed. As can be seen from FIG. 2, when ethanol was used as the dilution solvent in Example 1, the stabilizer was very effectively removed.

Experimental Example 3: Confirmation of Effectiveness of Transition Metal Dissolution by the Acetic Acid Treatment from Cobalt-Platinum Ratios Cobalt/platinum ratios were measured before and after the treatment with acetic acid in Example 1 and Comparative Example 1. The effectiveness of dealloying from the cobalt/platinum ratios was confirmed.

Figure 3:
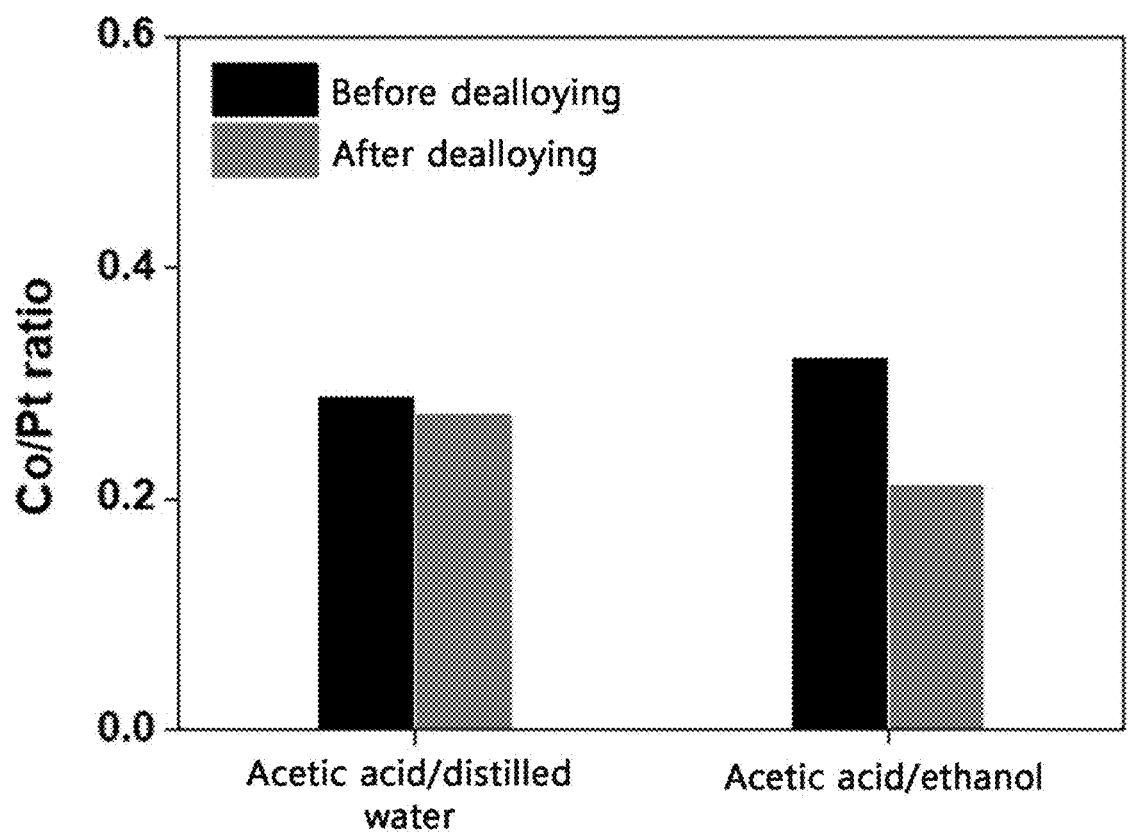
FIG. 3 confirms the effectiveness of dealloying by measuring transition metal/platinum ratios before and after treatment with acetic acid in Example 1 and Comparative Example 1.

FIG. 3 confirms the effectiveness of dealloying by measuring the transition metal/platinum ratios before and after the treatment with acetic acid in Example 1 and Comparative Example 1.

As confirmed from FIG. 3, a larger amount of cobalt was dissolved when treated with acetic acid/ethanol in Example 1 than when treated with acetic acid/distilled in Comparative Example 1. It appears that this is because ethanol as the dilution solvent facilitated removal of the surface-adsorbed stabilizer, as demonstrated in FIG. 2, to maximize the effect of acetic acid on the dissolution of the transition metal.

Experimental Example 4: Analysis of the Distribution Degrees of the Elements by Transmission Electron Microscopy (TEM)

The distribution degrees of platinum and cobalt in the platinum-cobalt nanoparticles of the carbon-supported platinum-cobalt alloy nanoparticle catalyst prepared in Example 1 were observed by transmission electron microscopy (TEM).

Figure 4A:
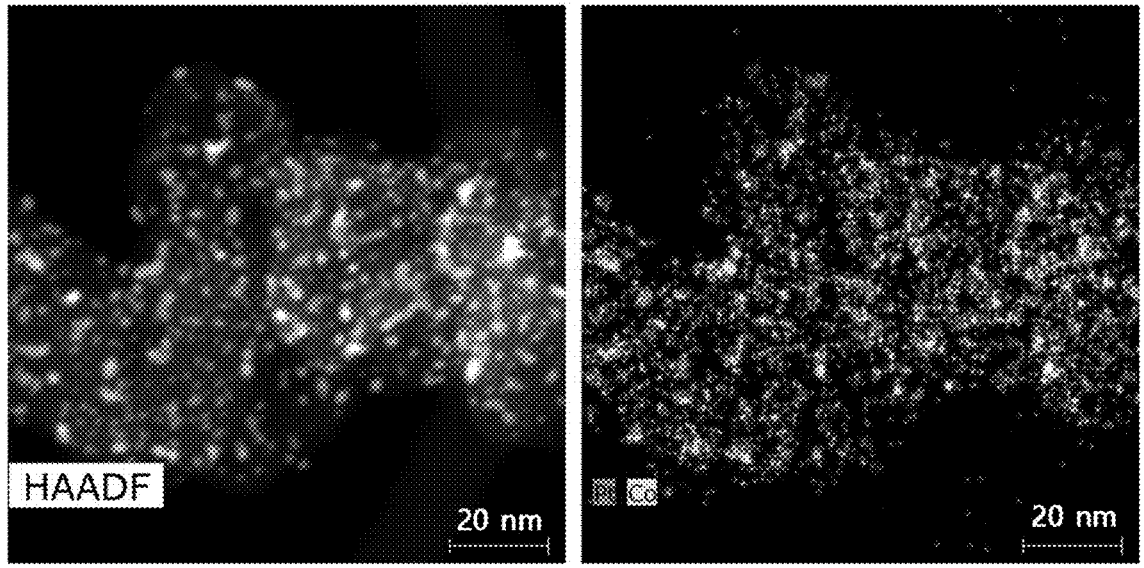
FIG. 4A shows high-angle annular dark-field (HAADF) and energy dispersive X-ray spectroscopy (EDX) images of platinum-cobalt alloy nanoparticles supported on carbon ($Pt_3Co$/KB-AP) before treatment with acetic acid/ethanol.
Figure 4B:
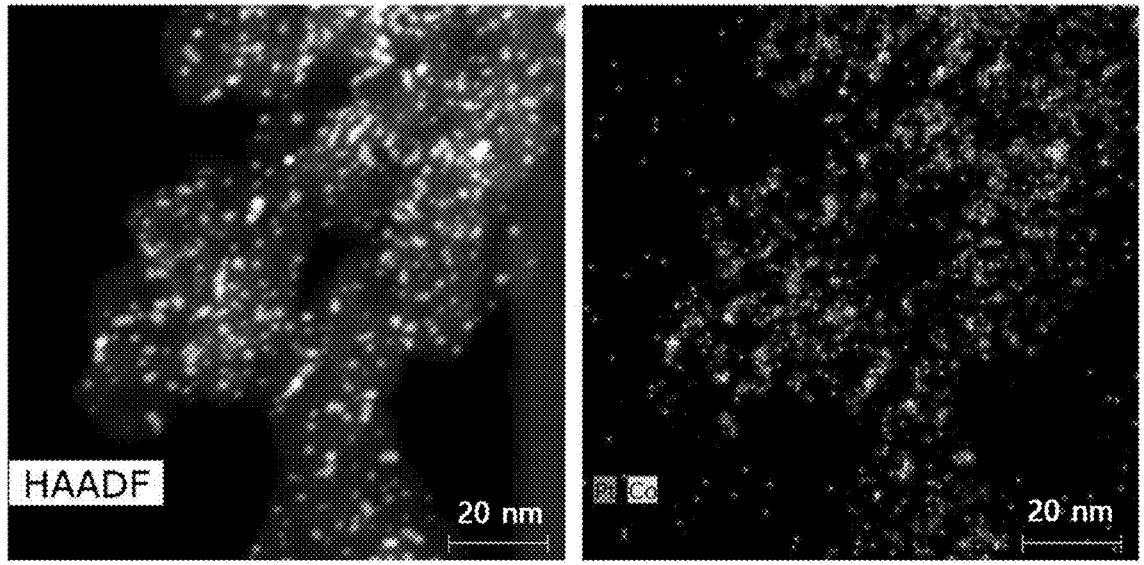
FIG. 4B shows HAADF and EDX images of platinum-cobalt alloy nanoparticles supported on carbon ($Pt_3Co$/KB-1AE-AP) after treatment with acetic acid/ethanol.

FIG. 4A shows high-angle annular dark-field (HAADF) and energy dispersive X-ray spectroscopy (EDX) images of the platinum-cobalt alloy nanoparticles supported on the carbon ($Pt_3Co$/KB-AP) before the treatment with acetic acid/ethanol. FIG. 4B shows HAADF and EDX images of the platinum-cobalt alloy nanoparticles ($Pt_3Co$/KB-1AE-AP) after the treatment with acetic acid/ethanol.

The EDX analysis in FIG. 4 shows that the treatment with acetic acid/ethanol was effective in dissolving the transition metal cobalt, as revealed in Experimental Examples 2 and 3.

Experimental Example 5: Oxygen Reduction Reaction Activity Measurement

The electrochemical oxygen reduction reaction (ORR) activities of the carbon-supported platinum-cobalt alloy nanoparticle catalysts prepared in Example 1 and Comparative Example 1 were evaluated using the membrane electrode assemblies constructed in Example 1-1 and Comparative Example 1-1, respectively.

Figure 5:
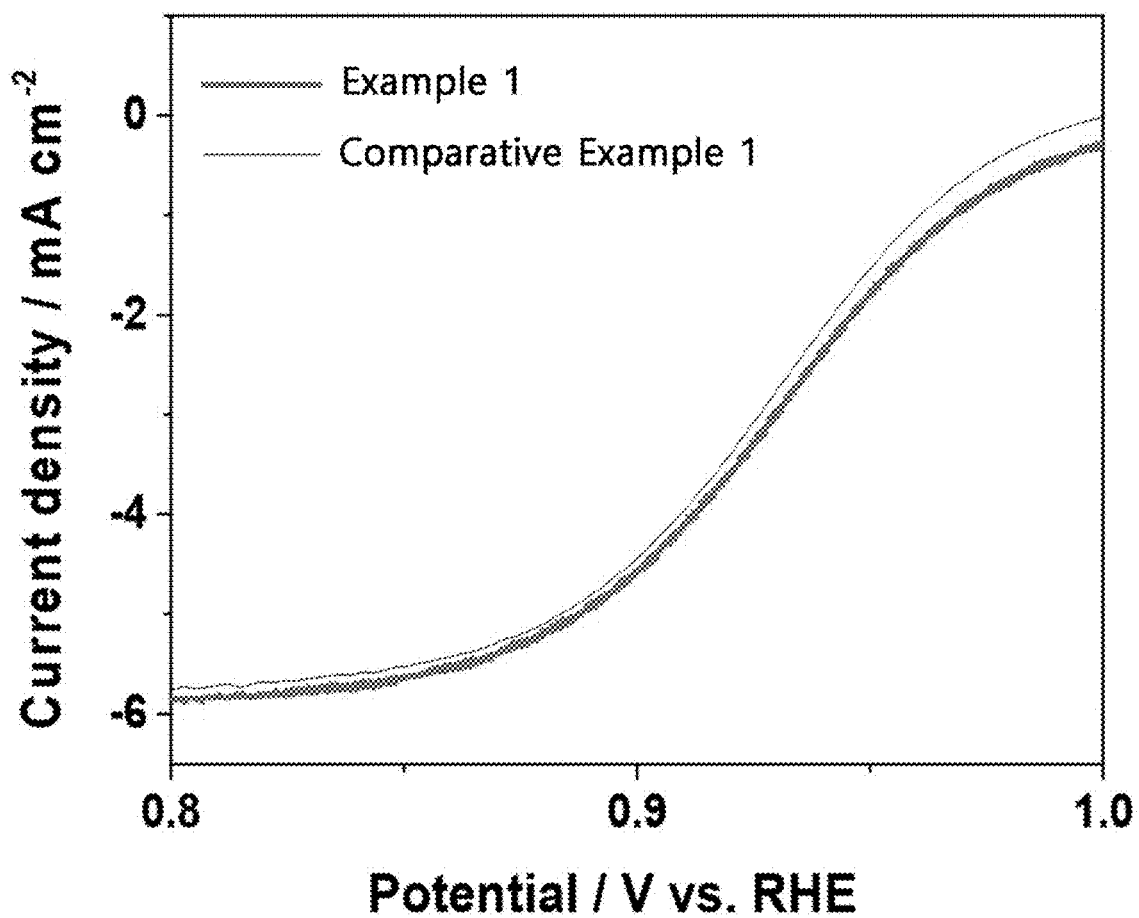
FIG. 5 shows performance curves of catalysts prepared in Example 1 and Comparative Example 1.

FIG. 5 shows electrochemical oxygen reduction reaction performance curves of the carbon-supported platinum-cobalt alloy nanoparticle catalysts, which were measured using the membrane electrode assemblies constructed in Example 1-1 and Comparative Example 1-1.

As can be seen from FIG. 5, a smaller potential shift was observed in the membrane electrode assembly of Example 1-1 than in the membrane electrode assembly of Comparative Example 1-1, demonstrating better oxygen reduction reaction activity of the catalyst of Example 1. This is believed to be because the removal of the surface-adsorbed stabilizer by ethanol leads to an improvement in the performance of the catalyst of Example 1, whereas the stabilizer was incompletely removed and remained adsorbed to the surface of the catalyst of Comparative Example 1, deteriorating the performance of the catalyst.

As is apparent from the foregoing, the transition metal on the nanoparticle surface and the stabilizer are simultaneously removed by treatment with acetic acid. Therefore, the method of the present invention enables the preparation of a carbon-supported platinum-transition metal alloy nanoparticle catalyst in a simple and environmentally friendly manner compared to conventional methods. In addition, the carbon-supported platinum-transition metal alloy nanoparticle catalyst prepared by the method can be applied as a high-performance, highly durable fuel cell catalyst. Furthermore, the use of the organic solvent to dilute acetic acid enables effective removal of the stabilizer, leading to an improvement in the performance of the catalyst.

The present invention has been described herein with reference to its preferred embodiments. These embodiments do not serve to limit the invention and are set forth for illustrative purposes. Those skilled in the art will appreciate that various modifications can be made thereto without departing from the spirit of the present invention. Therefore, the scope of the invention should be defined by the appended claims.

What is claimed is:

1. A method for preparing a carbon-supported, platinum-transition metal alloy nanoparticle fuel cell catalyst, comprising:
   (a) mixing a solution containing a platinum precursor, a transition metal precursor, carbon, a stabilizer, and a reducing agent to provide a first mixture containing platinum-transition metal alloy nanoparticles supported on the carbon, and washing and drying the first mixture to obtain dried carbon-supported platinum-transition metal alloy nanoparticles;
   (b) treating the dried carbon-supported platinum-transition metal alloy nanoparticles with a dilute solution of acetic acid in ethanol to provide a second mixture containing acetic acid-treated nanoparticles supported on the carbon, and washing and drying the second mixture to provide dry acetic acid-treated nanoparticles; and
   (c) annealing the dry acetic acid-treated nanoparticles to provide said carbon-supported, platinum-transition metal alloy nanoparticle fuel cell catalyst.

2. The method according to claim 1, wherein the transition metal is selected from the group consisting of cobalt, palladium, osmium, ruthenium, gallium, titanium, vanadium, chromium, manganese, iron, nickel, copper, zinc, and mixtures thereof.

3. The method according to claim 1, wherein the stabilizer is selected from the group consisting of oleylamine, octylamine, hexadecylamine, octadecylamine, trialkylphosphines, oleic acid, lauric acid, linoleic acid, erucic acid, dodecylic acid, and mixtures thereof.

4. The method according to claim 1, wherein the reducing agent is selected from the group consisting of a borohydride compound, an alcohol, an aldehyde, and mixtures thereof,
   wherein the borohydride compound is selected from the group consisting of-sodium borohydride, lithium borohydride, and lithium triethylborohydride,
   wherein the alcohol is selected from the group consisting of ethylene glycol, diethylene glycol, triethylene glycol, tetraethylene glycol, dipropylene glycol, propanediol, and butanediol, and
   wherein the aldehyde is formaldehyde.

5. The method according to claim 1, wherein the dilute solution of acetic acid in ethanol has a concentration of from 1 to 16 M.

6. The method according to claim 1, wherein washing in steps (a) and (b) is performed using one or more solvent.

7. The method according to claim 1, wherein drying in steps (a) and (b) is performed at room temperature.

8. The method according to claim 1, wherein annealing in step (c) is performed in a hydrogen atmosphere at a temperature of 600 to 1000° C.

9. The method according to claim 1, wherein the transition metal is cobalt, the stabilizer is oleylamine, the reducing agent is sodium borohydride, the concentration of the dilute solution is from 1 to 16 M, the washing in step (a) is performed using a mixture of ethanol and distilled water, the washing in step (b) is performed using distilled water, the drying in steps (a) and (b) is performed at room temperature, and the annealing in step (c) is performed in a hydrogen atmosphere at a temperature of 600 to 1000° C.

\* \* \* \* \*